(12) United States Patent
Kummer

(10) Patent No.: US 10,190,354 B2
(45) Date of Patent: Jan. 29, 2019

(54) ACTUATOR DEVICE FOR AUTOMATICALLY ACTIVATING THE VEHICLE DOOR OF A MOTOR VEHICLE

(71) Applicant: U-Shin Deutschland Zugangssysteme GmbH, Erdweg (DE)

(72) Inventor: Frank Kummer, Erdweg (DE)

(73) Assignee: U-SHIN DEUTSCHLAND ZUGANGSSYSTEME GMBH, Erdweg (DE)

( * ) Notice: Subject to any disclaimer, the term of this patent is extended or adjusted under 35 U.S.C. 154(b) by 147 days.

(21) Appl. No.: 14/653,467

(22) PCT Filed: Dec. 19, 2013

(86) PCT No.: PCT/EP2013/077345
§ 371 (c)(1),
(2) Date: Jun. 18, 2015

(87) PCT Pub. No.: WO2014/096172
PCT Pub. Date: Jun. 26, 2014

(65) Prior Publication Data
US 2015/0315838 A1 Nov. 5, 2015

(30) Foreign Application Priority Data
Dec. 20, 2012 (EP) ..................................... 12198355

(51) Int. Cl.
*E05F 15/614* (2015.01)
*F16H 1/32* (2006.01)
(52) U.S. Cl.
CPC ............. *E05F 15/614* (2015.01); *F16H 1/32* (2013.01); *E05Y 2201/618* (2013.01);
(Continued)

(58) Field of Classification Search
CPC ..... E05F 15/614; E05F 15/63; E05F 2015/31; F16H 1/32; F16H 2001/327;
(Continued)

(56) References Cited

U.S. PATENT DOCUMENTS 1,365,492 A * 1/1921 Hatlee ....................... F16H 1/32
 475/178
1,773,568 A * 8/1930 Braren ...................... F16H 1/32
 310/83

(Continued)

FOREIGN PATENT DOCUMENTS

EP 1 940 012 A1 7/2008
EP 2 543 808 A1 1/2013
(Continued)

OTHER PUBLICATIONS

International Search Report issued in PCT/EP2013/077345 dated Feb. 17, 2014 (3 pages).

*Primary Examiner* — Erin D Bishop
(74) *Attorney, Agent, or Firm* — Burris Law, PLLC

(57) ABSTRACT

An actuator device for automatically activating the vehicle door of a motor vehicle, in particular the tailgate, includes an electromotive drive and a radially extending arm. The radially extending arm is attached either to the vehicle door or to a vehicle bodywork and is set in motion by the electromotive drive. The electromotive drive has an electrical motor and a gearbox driven by the motor. The gearbox has a wobble mechanism.

10 Claims, 3 Drawing Sheets

(52) U.S. Cl.
CPC ..... *E05Y 2201/716* (2013.01); *E05Y 2201/72* (2013.01); *E05Y 2900/531* (2013.01); *F16H 2001/327* (2013.01)

(58) Field of Classification Search
CPC ......... F16H 2001/323; F16H 2001/328; E05Y 2201/618; E05Y 2201/716; E05Y 2201/72; E05Y 2900/531
See application file for complete search history.

(56) References Cited

U.S. PATENT DOCUMENTS

| | | | | |
|---|---|---|---|---|
| 2,170,951 | A | * | 8/1939 | Perry ........................ F16H 1/32 475/159 |
| 3,135,845 | A | * | 6/1964 | Barrett ................... A01G 9/241 200/564 |
| 3,998,112 | A | * | 12/1976 | Pierrat ...................... F16H 1/32 475/168 |
| 6,634,140 | B1 | * | 10/2003 | Sellman ................... E05F 15/63 49/340 |
| 8,407,937 | B2 | * | 4/2013 | Houser ................... E05F 15/63 49/139 |
| 2002/0104267 | A1 | | 8/2002 | Sato et al. |
| 2010/0186528 | A1 | | 7/2010 | Hillen et al. |
| 2013/0199321 | A1 | * | 8/2013 | Oberle .................... F16D 7/021 74/89.14 |

FOREIGN PATENT DOCUMENTS

| | | | | |
|---|---|---|---|---|
| GB | 1048279 | A | * 11/1966 | ............ E05F 15/692 |
| GB | 1 593 971 | A | 7/1981 | |

\* cited by examiner

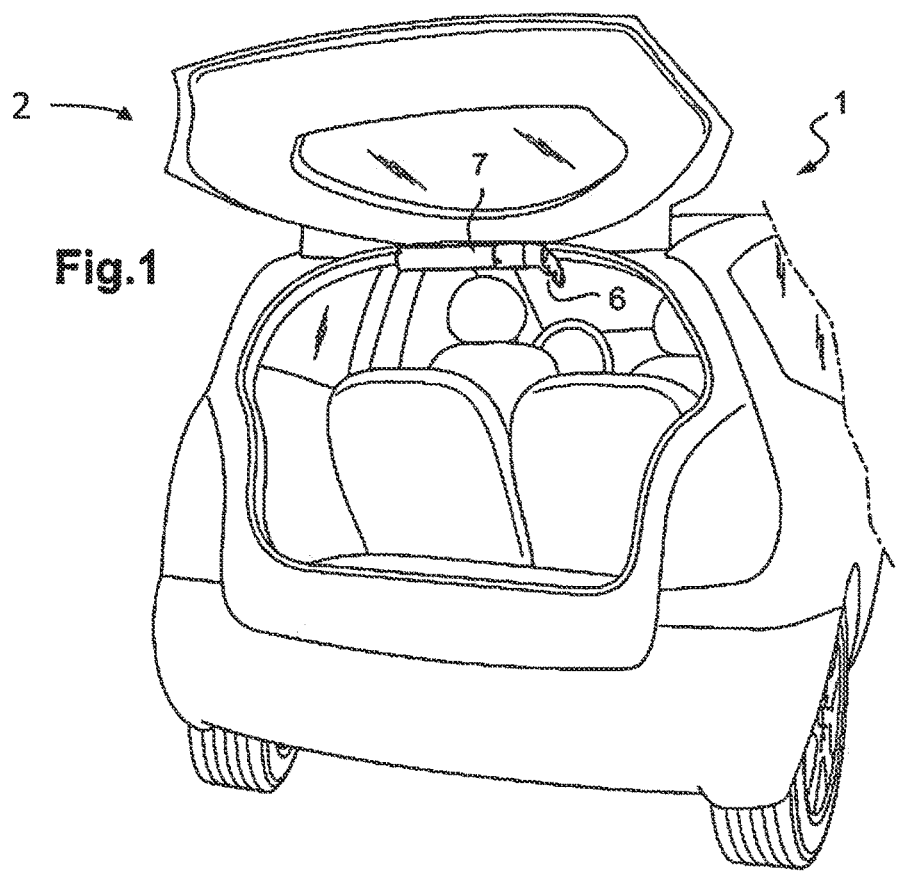
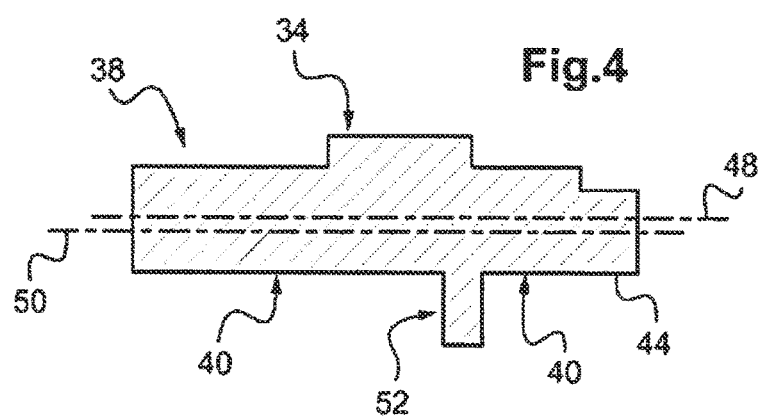

ACTUATOR DEVICE FOR AUTOMATICALLY ACTIVATING THE VEHICLE DOOR OF A MOTOR VEHICLE

The invention relates to an actuator device for automatically activating a vehicle door of a motor vehicle which comprises an arm configured to exert a torque on the vehicle door to open or close said door.

For the opening and closing, the actuator device comprises a radially extending arm engaging with the vehicle door. In this context, a vehicle door is understood in the following to be, inter alia, both the side doors and the tailgate or the boot lid of a vehicle.

A known actuator device of the generic type comprises a radial arm exerting a torque on the vehicle door, which is driven by means of an electromotive drive and 15 a transmission gearbox adapting the torque and rotation speed delivered by the motor to the needs of the door opening. This adapting is most often a reduction.

In order to avoid undesired pivoting of the vehicle door when the electromotive drive is deactivated, but at the same time to be able to activate the vehicle manually with little application of force, the output shaft of the electromotive drive is operatively connected to a brake device.

One problem of these known actuator devices is the noise generated from the motor and the gearbox during functioning. In addition, this problem may be even enforced when transmitted via the housing and the spindle directly to the vehicle body or to the tailgate. When an actuator device of this type is fixed on the body of the vehicle or to the tailgate, the acoustically perceptible level which is already present due to other components of the vehicle rises further.

One of the major sources of noise has been identified to be the gearboxes of the epicyclic or planetary gearings used in series (cascading architecture) to reach high rotation speed reduction values. Indeed, the conventionally used gearboxes are planetary gears. Even if these gearboxes are very efficient, the high number of teeth meshing together generates a high level of noise that is not acceptable, in particular for cars in the luxury segment where such actuator devices are often mounted.

One object of the present invention is to provide an actuator device having a lower level of noise, in particular noise produced by the gears of the electromotive drive to the body of the vehicle.

This object is obtained according to the invention by an actuator device for automatically activating a vehicle door of a motor vehicle, in particular the tailgate, which comprises an electromotive drive and a radially extending arm attached either to the vehicle door or to a vehicle bodywork and set in motion by the electromotive drive to open or close the vehicle door, said electromotive drive comprising an electrical motor and a gearbox driven by the motor, characterized in that, the gearbox comprises a wobble mechanism.

Such a wobble mechanism is a specific gear that allows for example a speed reduction. It comprises a reduction part and a part to transform an oscillating rotational movement into a rotational movement. The reduction part comprises an oscillating and rotating toothed wheel supported eccentrically by a rotating shaft and meshing with a fixed and static toothed ring.

Thus the toothed wheel describes an oscillating movement at the rotational speed of the rotating shaft. If the toothed wheel has fewer teeth than the toothed ring, the rotation speed of the toothed wheel is reduced with respect to the rotational speed of the rotating shaft.

In fact, such wobble mechanisms can generate less noise because only a few teeth of the toothed wheel and the toothed ring mesh together, therefore generating higher friction. Also the oscillating gear creates high gear ratio with a single gear contact. Therefore the oscillating gear with the cross disc clutch (wobble mechanism) built more compact in length than conventionally used gearboxes.

The actuator device according to the invention may further comprise one or more of the following characteristics, taken separately or in combination.

The wobble mechanism may comprise an excenter shaft rotationally driven by the electrical motor and supporting an oscillating front wheel having outer teeth and a fixed outer wheel having inner teeth meshing with the outer teeth of the front wheel, the front wheel having less teeth than the planetary wheel.

Said front wheel might be coupled to an output shaft disc via an Oldham coupling.

Said Oldham coupling may comprise an Oldham disc having first diametrically opposed recesses and second diametrically opposed second recesses, shifted by 90° with respect to said first recesses, said first recesses engage with two diametrical projections of said front wheel and said second recesses engage with projections carried by said output shaft disc.

Said excenter shaft may support rotationally the front wheel and the Oldham disc.

Said excenter shaft may carry in addition an excenter mass for compensation of vibrations generated by the oscillating front wheel.

The gearbox may comprise a tubular retaining element in which the planetary wheel is fixed.

The actuator device may comprise a brake device located between the electrical motor and the gearbox.

Said brake device may be a permanent-magnet-excited hysteresis brake.

The actuator device may comprise a first reduction device located between the electrical motor and the gearbox.

The gearbox may be coupled to the arm via an overload shaft configured to frictionally unclutch with an output shaft connected to the arm when the exerted torque values between the overload shaft and output shaft are beyond a predetermined value.

The actuator device may comprise connection means to a hinge of the vehicle door configured to integrate the actuator device in the hinge.

Further details and advantages of the invention emerge from the following exemplary embodiments explained with reference to figures, in which:

FIG. 1 is a schematic perspective view of the rear region of a motor vehicle with the tailgate opened and a laterally arranged actuator device according to the invention;

FIG. 4 shows a longitudinal section through the gearbox excenter shaft shown in FIGS. 2 and 3.

In all figures, the same reference numbers designate the same elements.

Figure 2:
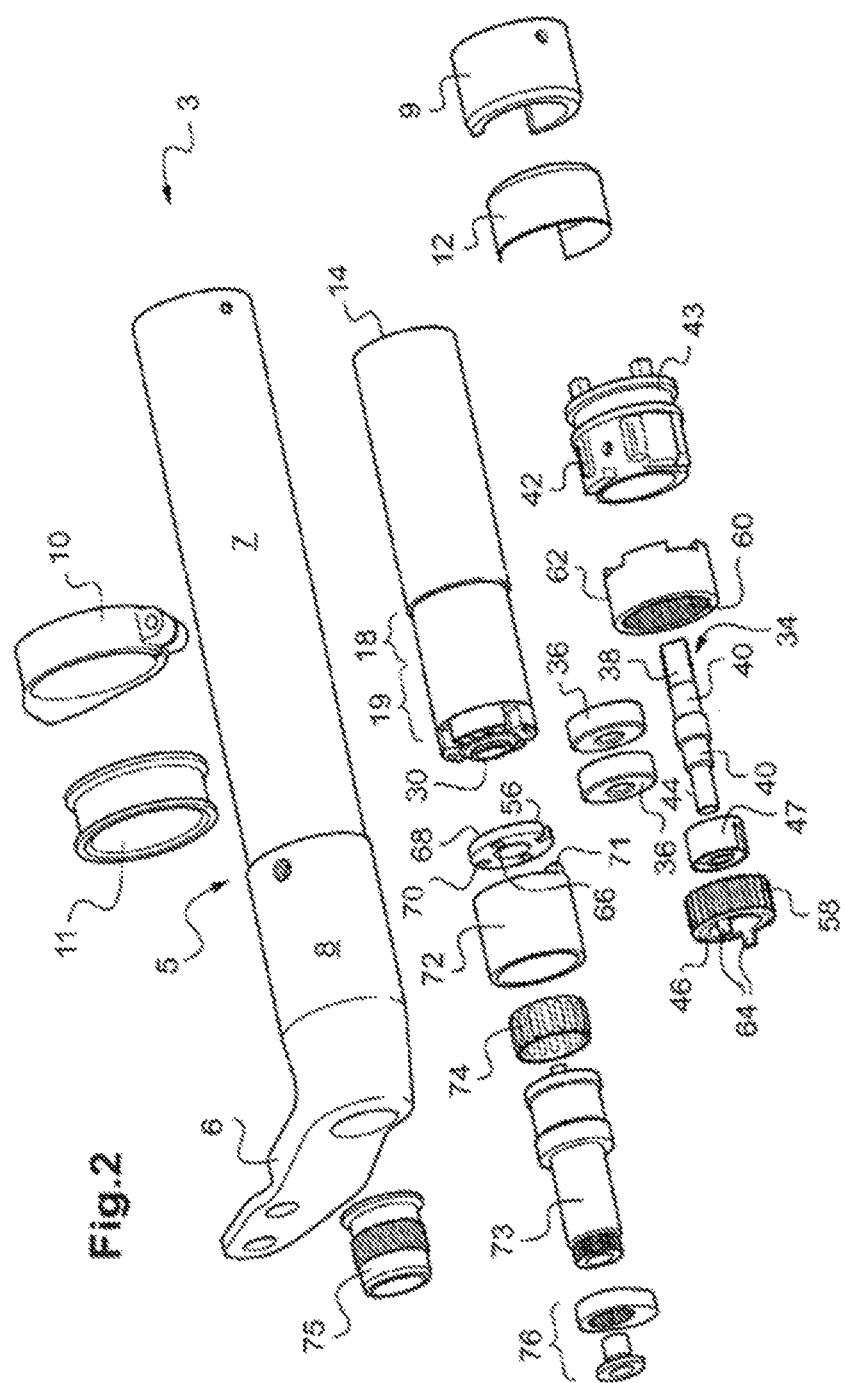
FIG. 2 shows partially the actuator device of FIG. 1 in an explosion view.

In FIG. 1, the numeral 1 designates a motor vehicle which has a tailgate 2 which can be pivoted by an actuator device 3 from a closed position into the opened position illustrated in FIG. 1, and if appropriate in turn into the closed position. The actuator device 3 is connected here to the bodywork of the motor vehicle 1 via a radial arm 6 and to the tailgate 2 by being connected to a tailgate hinge.

In particular, the actuator device 3 may comprise connection means to the associated vehicle door hinge.

As an alternative, the actuator device may be integrated in a driver or even passenger door of the vehicle, and/or the arm 6 may be attached to the mobile door, or tailgate 2.

Figure 3:
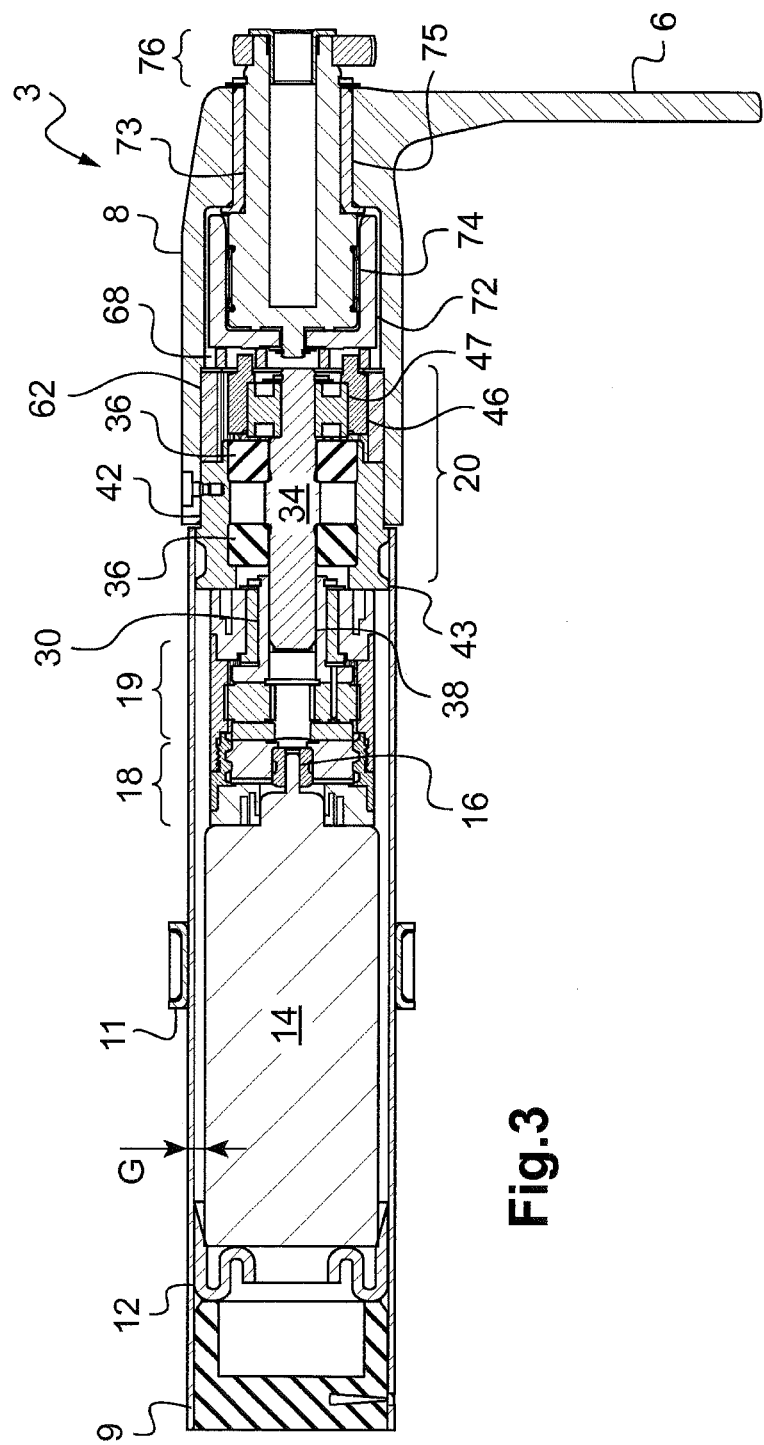
FIG. 3 shows more in detail a longitudinal section through the actuator device of FIG. 1.

Reference is now made to FIGS. 2 and 3 for the description of the inner parts of the actuator device 3.

The actuator device 3 comprises a tubular housing 5, in which the mechanism is contained. The tubular housing comprises a first tubular portion 7 and a second tubular portion 8, rotationally driven by the motor (not represented) with respect to the first one 7, and forming a support for the arm 6.

At the opposite end of the one carrying the arm 6 supporting tubular base 8 of the tubular housing 5, a cover disc 9 closes the tubular housing 5. A retaining bracket 10 surrounds the tubular housing 5 for attaching the actuator device 3 to the vehicle bodywork, with a rubber ring 11 placed between said housing 7 and said bracket 10 to reduce vibration transmission.

The retaining bracket 10 may in particular be attached to the vehicle bodywork, if the arm 6 is attached to the door 2, or to the vehicle door 2, if the arm 6 is attached to the bodywork.

Adjacent to the cover disc 9 is fixed into the first tubular housing portion 7 a motor damper 12 made of an elastic material, for example made of rubber.

On the other side of the motor damper 12 is fixed with one end an electrical motor 14. The motor damper 12 is here a rubber tube, part of which surrounds the one end of the motor 13 which has a roughly cylindrical shape.

The electrical motor 14 has an output shaft 16 coupled to a brake device 18.

More in detail, the brake device 18 is a hysteresis brake as described for example in EP1 940 012 the content of which is hereby incorporated by reference.

The brake device 18 is coupled to a first reduction device 19.

More in detail, the first reduction device 19 may for example be a two stepped epicyclic gearing.

The first reduction device 19 comprises essentially a first planet gear attached in rotation with the output shaft of the motor. The first planet gear meshes with satellite gears which comprise two radial segments with different diameters. The first planet gear meshes with the larger radius segment. The smaller radius segment meshes with a second planetary gear which is attached to the output shaft 30 of the first reduction device 19.

The ratio of the radii between first and second planetary gears corresponds to the reduction ratio of the first reduction device 19. Other reduction device types known from the state of art are also usable as first reduction device 19. If the door is light enough or if support elements such as one or more telescopic gas springs are implemented, no first reduction device 19 may be necessary.

The output shaft 30 of the first reduction device 19 is connected to the gearbox 20 of the actuator device 3, which comprises a wobble mechanism.

In particular, the wobble mechanism comprises a gearbox excenter shaft 34 rotationally supported by radial bearings 36.

As can be seen in detail, in particular in FIGS. 3 and 4, the gearbox excenter shaft 34 has at one end facing the electrical motor 14 and the brake device 18, an engagement portion 38 engaging into the tubular output shaft 30 of the first reduction device 19.

Two supporting portions 40 are held in radial bearings 36 that are supported fixed by a rotationally fixed, housing forming tubular retainer element 42 in contact with the brake device 18. In particular, the retainer element 42 is attached to the first tubular housing portion 7 by means of an annular portion 43 of larger diameter, forcefully inserted into the first tubular housing portion 7.

The supporting portion 40 farthest from the electrical motor 14 is adjacent to an excenter shaft portion 44 which rotationally supports via radial bearings 36 an oscillating front wheel 46. Between the excenter shaft portion 44 and the front wheel 46 is placed an annulus 47 rotating freely with respect to either one or both of the excenter shaft portion 44 and/or the front wheel 46.

As can be seen in particular on FIG. 4, the excenter shaft portion 44 has a smaller diameter than portions 38 and 40 with a center axis 48 that is eccentric with respect to the rotational axis 50 of the excenter shaft 34 which is concentric and in line with the output shaft 16 of the electrical motor 14.

On FIG. 4 is also represented an inertial mass 52 extending radially from the excenter shaft 34. This inertial mass 52 is used to outbalance the oscillations of the excenter shaft 34 when it rotates around its axis 50.

On the axial side that faces the arm 6 of the front wheel 46 is an Oldham coupling 56 that will be described more in detail later on.

When the excenter shaft 34 rotates, the oscillating front wheel 46 describes therefore an oscillating motion.

The oscillating front wheel 46 has outer teeth 58 that mesh with the inner teeth 60 of a planetary wheel 62 fixed in rotation with respect to the first tubular housing portion 7.

In order to make a gear reduction, the front wheel 46 has fewer teeth than the planetary wheel 62. As an example, the front wheel has 38 teeth whereas the planetary wheel has 40 teeth. In such a way a reduction ratio of 19:1 can be achieved.

As can be seen on FIG. 3, the planetary wheel 62 is fixed in rotation and held in position in particular by the retainer element 42.

Therefore, the reduction is achieved through the cooperation of the oscillating front wheel 46 and the planetary wheel 62.

In order to drive the arm 6, the output of the oscillating rotation of the front wheel 46 has two diametrical projections 64 for engagement with the Oldham coupling 56.

These projections 64 engage in correspondent diametrically opposed first recesses 66 of an Oldham disc (also called cross disk) 68 rotationally carried by the front wheel 46 of the gearbox 20.

The Oldham disc 68 has second recesses 70 that are also diametrically opposed, but 90° shifted with respect to the first recesses 66.

These second recesses 70 receive projections 71 of an overload shaft 72. This overload shaft 72 is rotationally attached to an output shaft 73 by means of a friction ring 74, inserted between the output shaft 73 and the overload shaft 72.

The material, dimensions and form of the friction ring 74 are selected so that when torque values corresponding to normal operation of the actuator device 3 are exerted either on the output shaft 73 or the overload shaft 72 the friction ring 74 maintains said shafts 72, 73 solidly attached in rotation, and so that in case of torque values higher than a predetermined value being applied, the ring 74 slides in rotation with one of the shafts 72, 73.

Thus, when the door 2 is blocked or when an important force is applied on said door 2, the torque between the output and overload shafts 72, 73 increases until a predetermined value where the shafts 72, 73 are frictionally unclutched. Therefore, the abnormally high torque values are not transmitted to the gearbox 20, the vehicle structure (door 2 or bodywork) and/or the motor 14 where harm might occur.

The output shaft 73 is attached by means of a bearing 75 and form fit 76 to the arm 6 support forming second tubular housing portion 8 and thus drives said second tubular housing portion 8 and the supported arm 6 in rotation at the reduced speed and with increased torque.

Due to the presence of the annular portion 43 on one end and of the motor damper 12, a gap G (see FIG. 3) is created between the motor 14, the braking device 18 and the first reduction device 19, on one hand and the first housing portion 7 on the other hand. Thus the motor 14, the braking device 18 and the first reduction device 19 are suspended, and only a minor portion of their vibrations is transmitted to the first housing portion 7 and resulting in noise.

In this way, only the gearbox 20 with the wobble mechanism, that generates fewer vibrations, is directly transmitting vibrations to the housing 5.

Furthermore, it is clear that in this way, the gearbox 20 together with the brake device 18 (and possible first reduction stage 19) may be assembled separately since forming a closed module.

Then this gearbox/brake unit 18, 20 can be assembled directly with the electrical motor 14, and then inserted in the housing 7.

In functioning, the shaft 16 of the electric motor 14 rotates and drives the excenter shaft 34 in motion. This causes the front wheel 46 to mesh with the teeth of the planetary wheel 62.

Therefore the front wheel 46 describes an oscillating movement at a speed corresponding to the rotational speed of the output shaft of the motor 14, reduced by the first reduction stage 19. In addition, the front wheel 46 rotates around the shaft 34 at a reduced speed which corresponds to the reduction value of the gearbox.

This reduced rotational speed of the front wheel 46 is fed to the Oldham coupling 56 that suppresses the oscillating movement and causes the output shaft 73 to rotate at the reduced rotational speed of the front wheel 46.

As shown above, the use of a wobble mechanism which comprises a shaft 34, a front wheel 46, a planetary wheel 62, and an Oldham coupling 56, as a gearbox 20 results in a very compact gearbox with reduced number of parts.

The reduced number of parts means a reduced susceptibility to failures and an easier and cheaper assembling.

Also, the obtained electromotive drive comprising the motor 14, brake device 18, first reduction stage 19 and gearbox 20 is potentially smaller and fitting in a smaller and easily concealed housing 7 while having similar efficiency in the torque exerted on the arm 6 than state-of-art drives.

In addition, as fewer teeth are meshing at the same time together than in gearboxes of known actuator devices with planetary construction, contact noise, and therefore overall noise can be reduced in an important way. In particular, in a standard epicyclic reduction gear device, six teeth contacts are meshing per reduction stage, considering three planet gears per stage, while in a wobble mechanism only one teeth set is meshing at every time.

Moreover, a wobble mechanism allows a better reduction rate per implemented stage, here as described about 19:1, when compared to a single epicyclic reduction stage, usually about 6:1.

In addition, such a wobble mechanism may be very compact. Therefore the wobble mechanism may be built shorter than the multiple epicyclic reduction stages needed to reach an equivalent reduction rate.

Furthermore, at equivalent torque value ranges, the average diameter of the considered reduction device may be reduced.

It has also been shown that the assembling of the gearbox is quite easy and may be robotized, contributing to reduce costs furthermore.

The invention claimed is:

1. An actuator device for automatically activating a vehicle door of a motor vehicle, comprising:
an electromotive drive and an arm attached to either the vehicle door or a vehicle bodywork and wherein the arm is configured to be set in motion by the electromotive drive to open or close the vehicle door,
wherein the arm extends radially with respect to a rotation axis of the electromotive drive, said electromotive drive comprising an electrical motor and a gearbox driven by the motor,
wherein the gearbox comprises a wobble mechanism,
wherein the gearbox is coupled directly to an overload shaft,
wherein the overload shaft is rotationally attached to an output shaft via a friction ring inserted between the output shaft and the overload shaft, the output shaft being coupled directly to the arm, and
wherein when torque values of the actuator device, which are exerted on either the overload shaft or the output shaft, are beyond a predetermined value, the friction ring slides in rotation with one of the overload shaft and the output shaft.

2. The actuator device according to claim 1, wherein the wobble mechanism comprises an excenter shaft, an oscillating front wheel, and a fixed planetary wheel, the excenter shaft is rotationally driven by the electrical motor and supports the oscillating front wheel, the oscillating front wheel having outer teeth and the fixed planetary wheel having inner teeth meshing with the outer teeth of the front wheel, the front wheel having less teeth than the planetary wheel.

3. The actuator device according to claim 2, wherein the gearbox further comprises an Oldham coupling, and the front wheel is coupled to the overload shaft via the Oldham coupling.

4. The actuator device according to claim 3, wherein the Oldham coupling comprises an Oldham disc having first diametrically opposed recesses and second diametrically opposed recesses, shifted by 90° with respect to said first recesses, said first recesses engage with two diametrical projections of said front wheel and said second recesses engage with projections carried by said overload shaft.

5. The actuator device according to claim 4, wherein said excenter shaft supports rotationally the front wheel and the Oldham disc.

6. The actuator device according to claim 2, wherein the gearbox comprises a tubular retaining element in which the planetary wheel is fixed.

7. The actuator device according to claim 1, further comprising a brake device located between the electrical motor and the gearbox.

8. The actuator device according to claim 7, wherein the brake device is a permanent-magnet-excited hysteresis brake.

9. The actuator device according to claim 1, further comprising a first reduction device located between the electrical motor and the gearbox.

10. The actuator device according to claim 1,
wherein the wobble mechanism comprises a gearbox excenter shaft rotationally supported by radial bearings, and
wherein the excenter shaft comprises: a rotational axis; and an excenter mass that outbalances oscillations of the excenter shaft when the excenter shaft rotates around the rotational axis of the excenter shaft.

* * * * *